(12) United States Patent
Thangarasa et al.

(10) Patent No.: US 12,069,585 B2
(45) Date of Patent: Aug. 20, 2024

(54) METHODS FOR VALIDATING MEASUREMENTS FOR RELIABLE PUR TRANSMISSIONS

(71) Applicant: TELEFONAKTIEBOLAGET LM ERICSSON (PUBL), Stockholm (SE)

(72) Inventors: Santhan Thangarasa, Vällingby (SE); Gerardo Agni Medina Acosta, Märsta (SE); Muhammad Kazmi, Sundbyberg (SE); Sandeep Narayanan Kadan Veedu, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 325 days.

(21) Appl. No.: 17/635,674

(22) PCT Filed: Aug. 14, 2020

(86) PCT No.: PCT/IB2020/057701
§ 371 (c)(1),
(2) Date: Feb. 15, 2022

(87) PCT Pub. No.: WO2021/028886
PCT Pub. Date: Feb. 18, 2021

(65) Prior Publication Data
US 2022/0330164 A1 Oct. 13, 2022

Related U.S. Application Data

(60) Provisional application No. 62/887,589, filed on Aug. 15, 2019.

(51) Int. Cl.
*H04W 52/14* (2009.01)
*H04W 24/10* (2009.01)
(Continued)

(52) U.S. Cl.
CPC ......... *H04W 52/146* (2013.01); *H04W 24/10* (2013.01); *H04W 52/242* (2013.01); *H04W 56/0045* (2013.01)

(58) Field of Classification Search
None
See application file for complete search history.

(56) References Cited

U.S. PATENT DOCUMENTS

2015/0281989 A1* 10/2015 Yang ................. H04W 36/0094
455/437

FOREIGN PATENT DOCUMENTS

CN 104094548 A 10/2014

OTHER PUBLICATIONS

3GPP, "3rd Generation Partnership Project; Technical Specification Group Radio Access Network; Evolved Universal Terrestrial Radio Access (E-UTRA); Physical layer procedures (Release 15)", TS 36.213 V15.6.0, Jun. 2019.
(Continued)

*Primary Examiner* — Suhail Khan

(57) ABSTRACT

A wireless device performs an uplink transmission, such as an idle-mode uplink transmission using preconfigured uplink resources (PUR). The wireless device determines whether a serving-cell signal measurement M2 was completed within a predetermined range of time before a reference time T2, the reference time T2 corresponding to an uplink transmission opportunity. Responsive to determining that the serving-cell signal measurement M2 was not completed within the predetermined range of time, the wireless device either defers transmission to a subsequent transmission opportunity, or drops the uplink transmission, or collects an additional serving-cell measurement M2' that falls within the predetermined range of time, for use in validating a TA for transmitting at the transmission uplink opportunity
(Continued)

and/or for estimating a PL for power control of a transmission at the uplink transmission opportunity.

15 Claims, 11 Drawing Sheets

(51) Int. Cl.
  *H04W 52/24* (2009.01)
  *H04W 56/00* (2009.01)

(56) References Cited

OTHER PUBLICATIONS

Ericsson, "Discussions on RRM requirements for transmissions using PUR for NB-IoT", 3GPP TSH-RAN WG4 Meeting #90bis, R4-1904578, Xi'an, China, Apr. 8-12, 2019.
Huawei et al., "Discussion on the preconfigured UL resource", 3GPP TSG-RAN WG4 Meeting #91, R4-1905607, Reno, USA, May 13-17, 2019.
Huawei et al., "Transmission in preconfigured UL resources", 3GPP TSG RAN WG1 Meeting #96, R1-1901503, Athens, Greece, Feb. 25-Mar. 1, 2019.
Ericsson, "Discussions on RRM requirements for transmissions using PUR for NB-IoT", 3GPP TSG-RAN WG4 Meeting #91, R4-1906795, Reno, United States of America, May 13-17, 2019.
Huawei et al., "UL transmission in preconfigured resource", 3GPP TSG RAN WG1 Meeting #97, R1-1905980, Reno, USA, May 13-17, 2019.

* cited by examiner

700

DETERMINE WHETHER A SERVING-CELL SIGNAL MEASUREMENT M2 WAS COMPLETED WITHIN A PREDETERMINED RANGE OF TIME BEFORE A REFERENCE TIME T2, THE REFERENCE TIME T2 CORRESPONDING TO A TRANSMISSION OPPORTUNITY (E.G., USING PUR)
702

RESPONSIVE TO DETERMINING THAT THE SERVING-CELL SIGNAL MEASUREMENT M2 WAS NOT TAKEN WITHIN THE PREDETERMINED RANGE OF TIME, EITHER DEFER TRANSMISSION TO A SUBSEQUENT TRANSMISSION OPPORTUNITY OR COLLECT AN ADDITIONAL SERVING-CELL MEASUREMENT M2' THAT FALLS WITHIN THE PREDETERMINED RANGE OF TIME, FOR USE IN VALIDATING A TIMING ADVANCE (TA) FOR TRANSMITTING AT THE TRANSMISSION OPPORTUNITY AND/OR FOR ESTIMATING A PATH LOSS (PL) FOR POWER CONTROL OF A TRANSMISSION AT THE TRANSMISSION OPPORTUNITY
704

*FIG. 7*

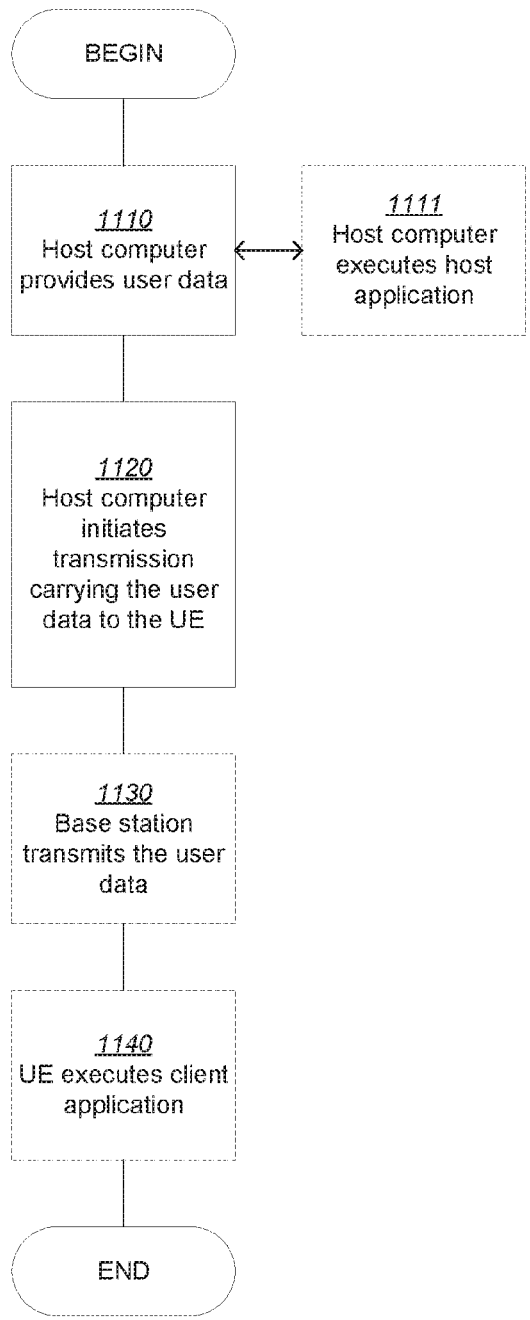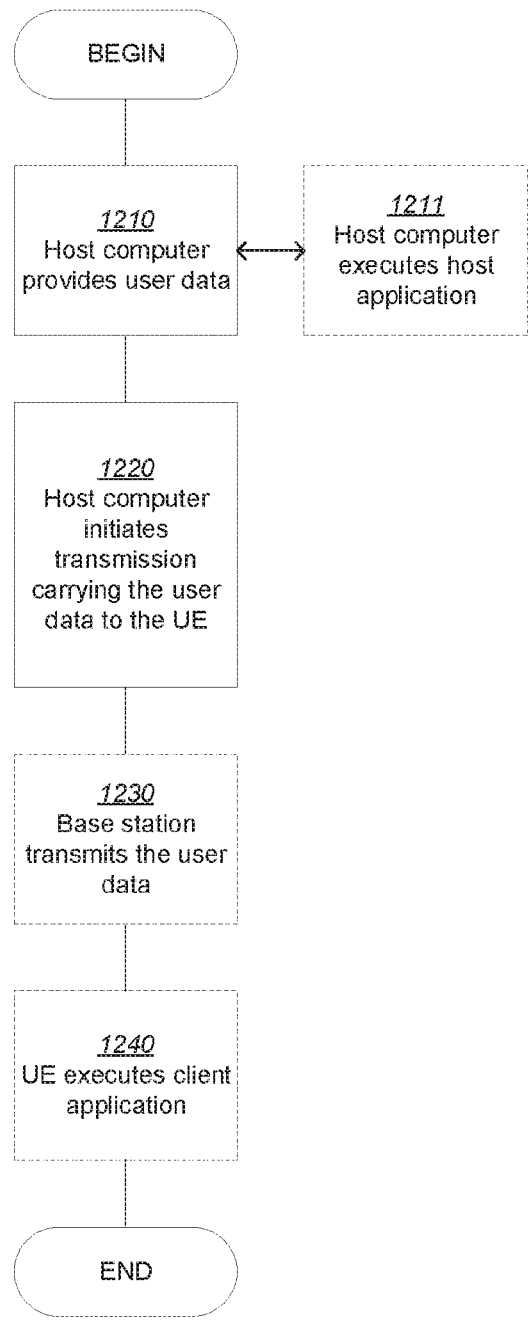
*FIG. 11*  *FIG. 12*

METHODS FOR VALIDATING MEASUREMENTS FOR RELIABLE PUR TRANSMISSIONS

RELATED APPLICATIONS

This application is a national stage application of International Patent Application No. PCT/IB2020/057701, filed Aug. 14, 2020, which claims the benefit of U.S. Provisional Pat. App. No. 62/887,589, filed Aug. 15, 2019, the disclosures of which are incorporated in their entirety by reference.

TECHNICAL FIELD

The present disclosure generally relates to the field of wireless network communications, and more particularly relates to validating measurements used for timing advance (TA) validation and/or path loss (PL) estimation, where the TA validation and/or PL estimation is used for uplink transmissions.

BACKGROUND

Members of the 3$^{rd}$-Generation Partnership Project (3GPP) have been specifying technologies to cover Machine-to-Machine (M2M) and/or Internet of Things (IoT)-related use cases. Recent work for 3GPP Release 13 and 14 includes enhancements to support Machine-Type Communications (MTC) with new user equipment (UE) categories (Cat-M1, Cat-M2), supporting reduced bandwidth of six physical resource blocks (PRBs) (up to 24 PRBs for Cat-M2), and Narrowband IoT (NB-IoT) UEs providing a new radio interface (and UE categories, Cat-NB1 and Cat-NB2).

The Long Term Evolution (LTE) enhancements introduced in 3GPP Release 13, 14 and 15 for MTC may be referred to as "eMTC", including (not limiting) support for bandwidth limited UEs, Cat-M1, and support for coverage enhancements. This is to separate discussion from NB-IoT (notation here used for any Release), although the supported features are similar on a general level.

There are multiple differences between "legacy" LTE and the procedures and channels defined for eMTC and for NB-IoT. Some important differences include a new physical channel, such as the physical downlink control channels, called MPDCCH (MTC physical downlink control channel) in eMTC and NPDCCH (narrowband physical downlink control channel) in NB-IoT, and a new physical random access channel for NB-IoT (NPRACH). Another important difference is the coverage level (also known as coverage enhancement level) that these technologies can support. By applying repetitions to the transmitted signals and channels, both eMTC and NB-IoT allow UE operation down to a much lower signal-to-noise ratio (SNR) level compared to LTE, i.e., Es/IoT≥−15 dB being the lowest operating point for eMTC and NB-IoT that can be compared to −6 dB Es/IoT for "legacy" LTE.

Transmission Using Preconfigured Unlink Resources

In Release 16 of the 3GPP specifications, NB-IoT and eMTC enhancements include a new feature called transmission in preconfigured uplink resources (PUR) in idle and/or connected mode. The UE is allocated with PUR resources during Radio Resource Control (RRC) connected state and is also assigned a Timing Advance (TA) value by the serving cell. The PUR resources can be of different types, namely dedicated, contention-free shared or contention-based shared PUR resources. A PUR resource is defined as a physical channel resource, such as a physical uplink shared channel (PUSCH) resource. That is, it is a resource allocated in both time and frequency domains. In the case of NB-IoT, a PUR resource is the same as the NB-IoT PUSCH (NPUSCH) resource. For Cat-M, it is the same as a PUSCH resource comprising six PRBs (e.g., for UE category M1) or 24 RBs (e.g. for UE category M2). Analogous to PUSCH and NPUSCH, repetitions can also be used for PUR transmissions, which is especially the case when operating under extended coverage.

The UE uses the preconfigured TA value when transmitting using the PUR resources in idle state provided the serving cell does not change. If the serving cell changes, then the PUR resources and TA value from the old serving cell become invalid. In addition, the UE can also be configured to check the validity of the TA value based on the changes in the signal strength (e.g., Reference Signal Received Power (RSRP) in MTC or NRSRP in NB-IoT). The UE is allowed to transmit using PUR only if the preconfigured TA value is valid, in that the signal conditions at the time of transmission are similar to those at the time the TA was configured. For example, if the magnitude of the difference between the measured signal strength (e.g., RSRP) at the time of transmission using PUR and the measured signal strength (e.g., RSRP) when the TA value was configured is below certain threshold, then the UE assumes that the preconfigured TA value is valid. If the TA value is valid, then the UE is allowed to use the PUR resources for transmission; otherwise, the UE should not carryout transmission using PUR.

Power Control for MTC and NB-IOT

For MTC, tThe setting of the UE Transmit power for a PUSCH transmission is defined as follows. If the UE transmits PUSCH without a simultaneous PUCCH for the serving cell c, then the UE transmit power $P_{PUSCH,c}(i)$ for PUSCH transmission in subframe/slot/subslot i for the serving cell c is given by:

$$P_{PUSCH,c}(i) = \min\begin{cases}P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i)\end{cases}[dBm].$$

If the UE transmits PUSCH simultaneous with PUCCH for the serving cell c, then the UE transmit power $P_{PUSCH,c}(i)$ for the PUSCH transmission in subframe/slot/subslot i for the serving cell c is given by:

$$P_{PUSCH,c}(i) = \min\begin{cases} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j) \cdot PL_c + \Delta_{TF,c}(i) + f_c(i) \end{cases}[dBm]$$

If the UE is not transmitting PUSCH for the serving cell c, for the accumulation of TPC command received with DCI format 3/3A for PUSCH, the UE shall assume that the UE transmit power $P_{PUSCH,c}(i)$ for the PUSCH transmission in subframe i for the serving cell c is computed by:

$$P_{PUSCH,c}(i) = \min\{P_{CMAX,c}(i), P_{O\_PUSCH,c}(1) + \alpha_c(1) \cdot PL_c + f_c(i)\}[dBm].$$

For NB-IOT, the UE transmit power $P_{NPUSCH,c}(i)$ for NPUSCH transmission in NB-IoT UL slot i for the serving cell c is given by:

For NPUSCH (re)transmissions corresponding to the random access response grant if enhanced random access power control is not applied, and for all other NPUSCH transmissions, when the number of repetitions of the allocated NPUSCH RUs is greater than two:

$$P_{NPUSCH,c}(i) = P_{CMAX,c}(i)[dBm]$$

otherwise $$P_{NPUSCH,c}(i) = \min\begin{cases} P_{CMAX,c}(i), \\ 10\log_{10}(M_{NPUSCH,c}(i)) + P_{O\_NPUSCH,c}(j) + \alpha_c(j) \cdot PL_c \end{cases}[dBm].$$

In particular, for both MTC and NB-IoT, there is an element in the power control algorithms that depends on signal strength measurements such as RSRP and NRSP measurements. This element is the path loss estimate, which is defined below, for MTC and NB-IOT.

For MTC, $PL_c$ is the downlink path loss estimate calculated in the UE for serving cell c in dB and $PL_c$=referenceSignalPower–higher layer filtered RSRP, where referenceSignalPower is provided by higher layers and RSRP is defined for the reference serving cell and the higher layer filter configuration is defined for the reference serving cell.

For NB-IoT, $PL_c$ is the downlink path loss estimate calculated in the UE for serving cell c in dB and $PL_c$=nrs-Power+nrs-PowerOffsetNonAncho–NRSRP, where nrs-Power is provided by higher layers, and nrs-powerOffsetNonAnchor is set to zero if it is not provided by higher layers and NRSRP is defined for serving cell c.

DRX Cycle Operation

In LTE, a discontinuous reception (DRX) cycle is used to enable a UE to save its battery. The DRX cycle is used in RRC idle state but it can also be used in RRC connected state. Examples of lengths of DRX cycles currently used in RRC idle state 320 ms, 640 ms, 1.28 s and 2.56 s. Examples of lengths of DRX cycles currently used in RRC connected state may range from 2 ms to 2.56 s. The enhanced DRX (eDRX) cycles are expected to be very long, e.g., ranging from several seconds to several minutes and even up to one or more hours. Typical values of eDRX cycles may be between 4-10 minutes.

The DRX cycle is configured by the network node and is characterized by the following parameters:

On duration: During the on duration of the DRX cycle, a timer called 'onDurationTimer', which is configured by the network node, is running. This timer specifies the number of consecutive control channel subframes (e.g., PDCCH, ePDCCH subframes) at the beginning of a DRX Cycle. It is also interchangeably called DRX ON period. More specifically, it is the duration in downlink subframes after the UE wakes up from DRX to receive the control channel (e.g., PDCCH, ePDCCH). If the UE successfully decodes the control channel (e.g. PDCCH, ePDCCH) during the ON duration, then the UE starts a drx-inactivity timer (see below) and stays awake until its expiry. When the onDurationTimer is running the UE is considered to be in DRX state of the DRX cycle.

drx-inactivity timer: It specifies the number of consecutive control channel (e.g., PDCCH, ePDCCH) subframes after the subframe in which a control channel (e.g., PDCCH) indicates an initial UL or DL user data transmission for this Medium Access Control (MAC) entity. It is also configured by the network node. When the drx-inactivity timer is running, the UE is considered to be in non-DRX state, i.e., no DRX is used.

Active time: This time is the duration during which the UE monitors the control channel (e.g., PDCCH, ePDCCH). In other words, this is the total duration during which the UE is awake. This includes the "on-duration" of the DRX cycle, the time during which the UE is performing continuous reception while the inactivity timer has not expired and the time the UE is performing continuous reception while waiting for a DL retransmission after one Hybrid automatic repeat request (HARQ) round trip time (RTT). The minimum active time is equal to the length of an on duration, and the maximum active time is undefined (infinite).

An example of the DRX ON and DRX OFF durations of the DRX cycle is shown in FIG. 1. An example of DRX operation with more detailed parameters in LTE is illustrated in FIG. 2. DRX configuration herein may also be an enhanced or extended DRX (eDRX) configuration. In legacy DRX related procedures, the UE can be configured with a DRX cycle length of up to 2.56 seconds. But, UEs supporting extended DRX (eDRX) can be configured with a DRX cycle at least longer than 2.56 seconds and typically much longer than 2.56 seconds, i.e., on the order of several seconds to several minutes. The eDRX configuration parameters include an eDRX cycle length and paging window length, also known as paging time window (PTW) length, etc. Within a PTW of the eDRX, the UE is further configured with one or more legacy DRX cycles.

SUMMARY

There are problems involving the TA. Transmission in RRC_IDLE mode using preconfigured uplink resources is realized by the UE obtaining a TA command in the RRC_CONNECTED state and later using that TA in RRC_IDLE state for adjusting the timing for the uplink transmission. However, the uplink transmission using PUR in RRC_IDLE state may not take place immediately or within a short time after the reception of the PUR configuration including the TA command. Typically, it instead occurs later in time. Prior to transmission, the UE is required to validate the received TA which is done using two Radio Resource Management (RRM) measurements, one of which is performed around the time when TA was obtained and the second one of which is performed around the time when the validation is performed. Moreover, the power control algorithms of both MTC and NB-IoT make use of a pathloss (PL) estimate to determine the uplink transmit power, where this PL is also estimated from RRM measurements. A problem with this behavior is that the measurement window is undefined, leading to ambiguous UE behavior and the possibility that the measurements used for TA validation and to estimate PL are quite old. In this case, these measurements may not reflect the actual radio conditions of the UE, for various reasons such as UE mobility, change of surrounding environment, UE timing drift, etc. Using such measurements for TA validation can result in an incorrect TA validation outcome and the wrong PL estimate.

Embodiments described herein are directed to addressing the issues that can lead to an incorrect TA validation outcome and the wrong PL estimate. According to some embodiments related to a wireless device (e.g., UE), the TA validation process and PL estimates are adapted at the UE based on the availability of the measurements at the UE. Adapting the TA validation process and PL estimates has an impact on the intended transmission (e.g., a PUR transmission), which may allow the UE to carry out the transmission or to postpone or drop the PUR transmission. The adapting may include comparing the available measurements to a set of measurement rules specifying whether or not they can be used for TA validation, PL estimation for power control, or PL change estimation. (See FIG. 3.) If the measurements are not valid (e.g., not taken within certain ranges of time), then the transmission may be deferred or dropped, or other measurements may be taken.

According to some embodiments, a method performed by a wireless device for performing an uplink transmission, such as an idle-mode uplink transmission using PUR, includes determining whether a serving-cell signal measurement M2 was completed within a predetermined range of time before and no later than a reference time T2, where the reference time T2 corresponds to an uplink transmission opportunity. The method further includes, responsive to determining that the serving-cell signal measurement M2 was not completed within the predetermined range of time, either deferring transmission to a subsequent uplink transmission opportunity, or dropping the uplink transmission, or collecting an additional serving-cell measurement M2' that falls within the predetermined range of time, for use in validating a TA for transmitting at the transmission opportunity and/or for estimating a PL for power control of a transmission at the transmission opportunity.

According to some embodiments, a method by a wireless device for performing an uplink transmission, such as an idle-mode uplink transmission using PUR, includes obtaining configuration information comprising a TA at a first reference time T1 and comparing a second reference time T2 to the first reference time T1, where the second reference time T2 is a time at which a TA validation, path loss (PL) estimation for power control, and/or path loss change estimation is to be performed. This method further includes, in response to determining that the time difference between the first and second reference times T1, T2 does not meet the given difference threshold, one of: (a) performing the TA validation, PL estimation for power control, and/or PL change estimation using any measurements available at the wireless device or performing a new measurement, and performing the uplink transmission based on the TA validation, PL estimation for power control and/or PL change estimation; (b) postponing the uplink transmission until a third reference time T3; and (c) dropping the uplink transmission Further aspects of the present invention are directed to an apparatus, wireless device, UE, network node, base station, relay node, network devices, computer program products or computer readable storage medium corresponding to the methods summarized above and functional implementations of the above-summarized wireless relay node.

Advantages of the embodiments include that TA validation is more reliable when the measurements used for TA validation better represent the time when TA was received and TA validation is performed. Other advantages include a higher probability that a receiving node can receive the transmissions. When these techniques are applied to PUR transmissions, this in turn makes better usage of PUR resources.

BRIEF DESCRIPTION OF THE FIGURES

FIG. 7 illustrates a flowchart illustrating a method in the wireless device, according to some embodiments.
FIGS. 11, 12, 13, and 14 are flowcharts illustrating example methods implemented in a communication system including a host computer, a base station and a user equipment.

DETAILED DESCRIPTION

Figure 1:
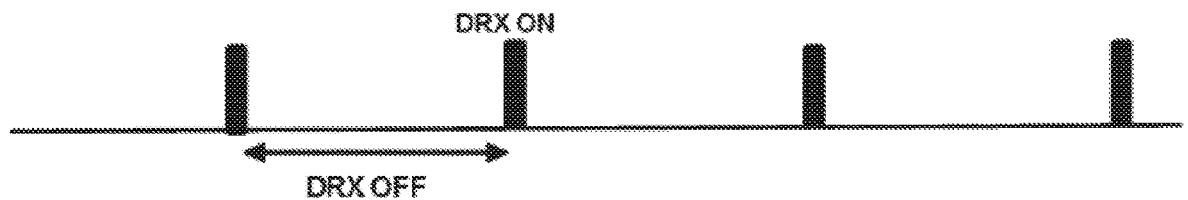
FIG. 1 illustrates DRX ON and DRX OFF periods.
Figure 2:
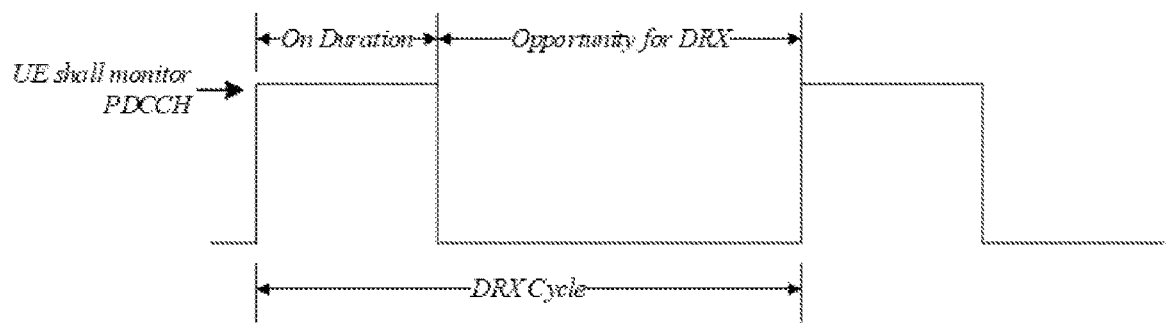
FIG. 2 illustrates DRX cycle operation in LTE.

Exemplary embodiments of the present disclosure will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment can be tacitly assumed to be present/used in another embodiment. Any two or more embodiments described in this document may be combined with each other. The embodiments are described with respect to LTE or NR, but can be adapted in other radio access technologies where the techniques or selections may be relevant.

Embodiments described herein are directed to validating measurements used for TA validation and/or PL estimation. When this validation is performed in connection with PUR transmissions, this leads to better use of preconfigured resources (PUR).

In some embodiments described herein, the more general term "network node" is used. This term can correspond to any type of radio network node or any network node that communicates with a UE and/or with another network node. Examples of network nodes are NodeB, MeNB, SeNB, a network node belonging to MCG or SCG, base station (BS), multi-standard radio (MSR) radio node such as MSR BS, eNodeB, gNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc), O&M, OSS, SON, positioning node (e.g. E-SMLC), MDT, test equipment (physical node or software), etc.

In some embodiments the non-limiting term user equipment (UE) or wireless device is used. As used herein, this term refers to any type of wireless device communicating with a network node and/or with another UE in a cellular or mobile communication system. Examples of UE are target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles, ProSe UE, V2V UE, V2X UE, etc.

The embodiments are described for LTE e.g. MTC and NB-IoT. However, the embodiments are applicable to any RAT or multi-RAT systems, where the UE receives and/or transmit signals (e.g. data) e.g. LTE FDD/TDD, WCDMA/HSPA, GSM/GERAN, Wi Fi, WLAN, CDMA2000, 5G, NR, etc.

The term "time resource" as used herein may correspond to any type of physical resource or radio resource expressed in terms of length of time. Examples of time resources are: symbol, mini-slot, time slot, subframe, radio frame, TTI, short TTI, interleaving time, etc.

In a scenario comprising a UE served by a first cell, which may be referred to as "cell1," cell is managed or served or operated by a network node (NW1), e.g. a base station. The UE operates in a certain coverage enhancement (CE) level with respect to a certain cell, e.g., with respect to cell1. The UE is configured to receive signals (e.g., paging, WUS, NPDCCH, MPDCCH, NPDSCH, PDSCH etc) from at least cell1. The UE may further be configured to perform one or more measurements on cell and on one or more additional cells, e.g., neighbor cells.

Several embodiments related to a wireless device (e.g., UE) operating under cell1 served by network node NW1 will be described. According to some embodiments, in a first step, the UE obtains information about PUR configuration at time instance T1. This information may comprise, but is not limited to, any or all of the following: whether or not the UE is PUR capable; whether or not the UE is assigned any PUR transmission resources, e.g., periodic, aperiodic resources; a TA value associated with PUR configuration; and PUR resources that can be of different types, namely dedicated, contention-free shared or contention-based shared PUR resource. The obtained information about PUR configuration may comprise, for example, the PUR transmission periodicity (e.g., a PUR transmission resource taking place every Nth millisecond and for a duration of M milliseconds), a PUR start position, and timing advance information with respect to the target cell. The PUR transmission resource may comprise one or more time-frequency resources (e.g., resource blocks, subcarriers, etc).

The received configuration may further comprise information about the TA validation method to use, e.g.: whether the UE is required to validate the TA prior to PUR transmission using RRM measurements on cell1; whether TA is always assumed to be valid in cell1; or whether UE is configured to use any timer (e.g., TAT) related to TA, e.g., such that TA is assumed to be valid until timer expires. The embodiment described here may be under the assumption that the UE has been configured to use TA validation based on serving cell measurement changes.

Figure 3:
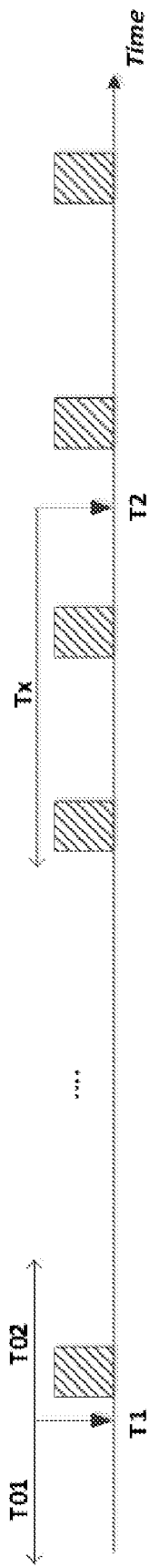
FIG. 3 illustrates rules for RRM measurement based TA validation, according to some embodiments.

In a second step, the UE associates a first measurement (M1) with T1, following a set of rules. According to a first aspect of these rules, M1 is performed by the UE on signals transmitted by the serving cell closely in time to T1 as much as possible, because the intention is to reflect the actual radio conditions of the UE with respect to cell1 at time instance T1. This is exemplified in FIG. 3 where T1 is assumed to be the reference time when UE obtained the PUR configuration including the TA value. In another example, T1 corresponds to the time UE obtains the updated TA from NW1, e.g., it can be obtained in the retransmission grant, or L1 ACK, or L2/L3 ACK, transmitted in response to the PUR transmission. T1' is the actual time at which M1 is performed on the serving cell by the UE. More specifically, the UE has completed M1 at time instance T1'. The measurement M1 is performed over a duration $\Delta T1$ using N samples where $N \geq 1$. The UE may typically obtain one sample per DRX cycle. The measurement period is also interchangeably called as L1 measurement period, evaluation period, measurement time, etc.

According to the rule applicable to some embodiments, the UE is allowed to use M1 for TA validation only if T1 and T1' are closely spaced in time with respect to each other. For example, M1 is allowed to be used for the TA validation provided that the magnitude of the difference between T1 and T1' is within a certain margin. In one specific example, the UE is allowed to use M1 for TA validation only if the following condition is met:

$$(T1-T01) \leq T1' \leq (T1+T02) \qquad (1)$$

For the special case when T01=T02 then:

$$(T1-T01) \leq T1' \leq (T1+T01).$$

Figure 4:
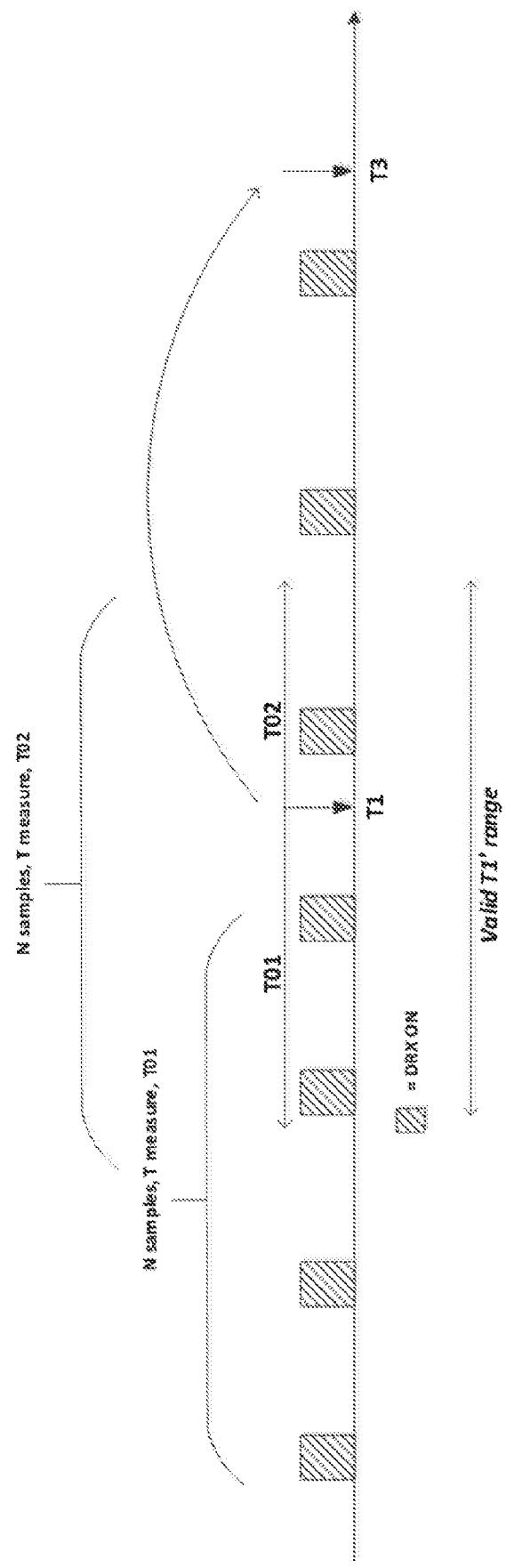
FIG. 4 illustrates rules for associating M2 with T2 prior to TA validation, according to some embodiments.

This principle is illustrated in FIG. 4, where T1' is the time instance at which if M1 is completed by the UE, then it is considered valid. This means M1 can start earlier than T1−T01 or T1+T02 but the last sample used for filtering and the final measured value is available within the range in (1). In other words, the measurements may have started earlier than T1−T01 or T1+T02, but the final sample and the measured value is available at the UE within the range (1). In some cases, T01=T02.

If the condition in (1) is fulfilled, then the UE is allowed to use such a measurement (M1) to represent measurement at T1 and use it later for TA validation and/or to provide a PL estimate. However, if the above condition is not fulfilled, then the UE is required to perform a new measurement that can better represent the measurement conditions of T1 and store it for later use for TA validation and/or to provide a PL estimate.

Since PUR transmissions typically consist of small amount of data, and they are transmitted directly from inactive state (e.g., RRC_IDLE state), the UE achieves improved power consumption by not switching to RRC_CONNECTED state for the transmission purpose. Likewise, in order to improve the power consumption further, the UE is not required to perform any dedicated measurement for TA validation purpose. However, it is important that the measurement used for TA validation can fulfill the condition in (1). With this rule, the UE has the freedom to use any available measurements that are available at the UE (which helps the UE reduce the power consumption), but at the same time, it ensures that the measurement is not outdated. If the UE can fulfill the condition in (1), it means the measurement is at maximum −T01 or +T02 old, and the radio conditions are not likely to change very much within this short duration. Hence, the UE is allowed to use M1 performed at T1' to represent the radio conditions at T1.

Figure 5:
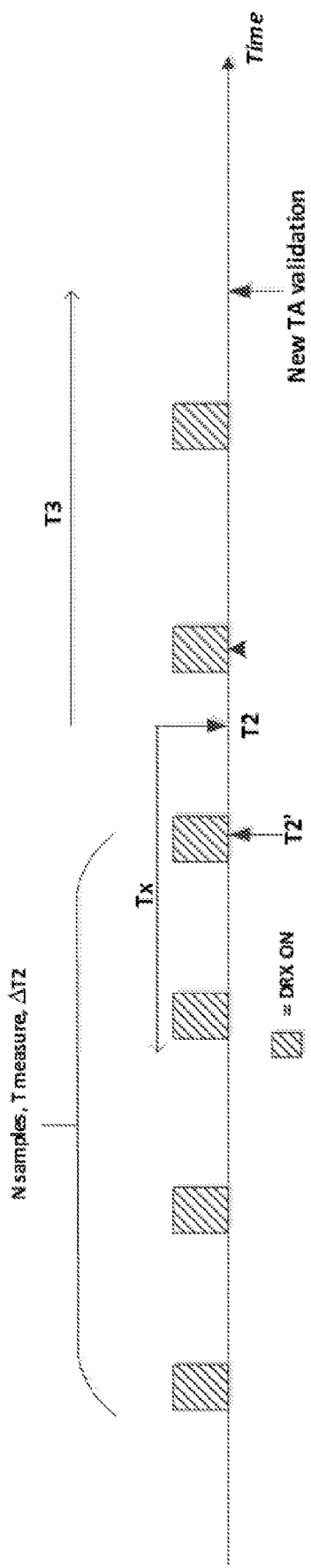
FIG. 5 illustrates rules for associating M2 with T2 prior to TA validation, according to some embodiments.

In a third step, the UE associates a second measurement (M2) with T2, following another set of rules. T2 is the reference time when the UE is performing TA validation or determining a change in path loss using the two measurements M1 that is obtained from the previous step and M2 obtained as described below. M2 is also performed by the UE on signals transmitted by the serving cell, and it can be used on its own to estimate the PL term in the power control algorithms of both MTC and NB-IoT as to determine the UL transmit power. It is assumed that M2 is actually performed by the UE by time instance T2'. This means that by time T2', the UE has completed the measurement even though the measurement has started before T2', e.g., T2'−ΔT2 where ΔT2=M2 measurement period during which UE performs the measured value based on N samples where N>=1. The UE may also typically obtain one sample per DRX cycle. In other words, the last sample used for filtering of M2 is already available and the filtered measurement is available for use prior to reference time T2. This is a key difference compared to M1, where the UE is allowed to take the measurement of both T01 time units before and T02 time units after T1. In this case, since TA validation is actually performed at T2, there is no point in waiting for measurement which is going to be available in future. Therefore, as a general rule, M2 is considered to be valid for the TA validation method provided that M2 is completed by the UE latest by T2 but not earlier than time instance (T2−Tx). FIG. 5 illustrates rules for associating M2 with T2 prior to TA validation.

More specifically, M2 is considered a valid measurement for the TA validation method if it fulfills the following condition:

$$(T2-Tx) \leq T2' \leq T2 \quad (2)$$

Otherwise M2 is considered invalid, in which case the UE may need to perform a new measurement that meets the above condition, or it may delay the PUR transmission until any future PUR transmission opportunity, which occurs at least T3 time units after T2, or it may drop PUR and fallback to legacy RACH/EDT.

In a fourth step, according to some embodiments, the UE carries out the TA validation and/or path loss estimate(s) provided that the measurements (M1 and M2) obtained from step 2 and 3 are considered to be valid, e.g., if M1 and M2 are fulfilling the conditions in (1) and (2) respectively. For example, if both M1 and M2 measurements are both valid, then the UE may compare them with respect to each other and based on their comparison may decide whether TA is valid or not. For example, if the magnitude of the difference between M1 and M2 is less than a certain threshold (G) then the UE may assume that the TA is valid; otherwise, it is invalid. The UE may also be configured to use one or more additional methods for validating the TA, e.g., based on the cell change.

If the UE is configured to use only signal strength-based TA validation method (based on M1 and M2 relation), and if the TA is determined to be valid based on the signal strength, then the UE can use the TA for the PUR transmission; otherwise, the UE does not use the TA for the PUR transmission. If at least one of the M1 and M2 measurements is invalid, then the UE may not even use M1 and M2 for validating the TA. In this case the UE will not use the TA for the PUR transmission or it may need perform new dedicated measurement for TA validation purpose.

Another embodiment related to the wireless device will be described. The method in this embodiment may involve the wireless device (UE) receiving the PUR configuration and obtaining the information about the reference time T1 that corresponds to the time when the TA was obtained from the network node. The method may further include determining the reference time T2, i.e., when the UE is expected to perform the TA validation. The method includes comparing T1 and T2, and, based on the results of the comparison, taking any of following actions: carrying out the TA validation using M1 and M2 provided that |T1−T2|≥X, or postponing the PUR transmission by T3, or dropping the PUR transmission (as described in the previous embodiment).

According to a first step in a method according to this embodiment, the UE receives the PUR configuration that includes the TA. From this information, UE knows the reference time of T1. In a second step, the UE determines the reference time T2 at which the UE is expected to perform the TA validation and/or to provide a PL estimate for PUR transmission. T2 can be obtained explicitly or implicitly from the PUR configuration. For example, from the obtained PUR configuration, the UE knows when the UE is expected to wake up and transmit data. Alternatively, if it has been configured with aperiodic PUR reporting then the UE should have the information about when data has been triggered or when data is available for transmission. For example, when data is available in the UE buffer, the UE can determine when the PUR transmission is expected and before that (at T2) the UE has to perform TA validation and/or to provide a PL estimate. Thus, T2 is known to the UE. Moreover, M2 associated with T2 can be used on its own to estimate the PL term in the power control algorithms of both MTC and NB-IoT as to determine the UL transmit power.

In a third step, the UE compares the values of T1 and T2 that are obtained in the previous steps and carries out the TA validation or change in path loss based on the results of the comparison. For example, the UE is required to use M1 and M2 measurements performed by time instances T1' and by T2' respectively (i.e., according to the conditions described in the second and third steps respectively) provided that T1 and T2 are related by a certain function; otherwise, the UE is allowed to use any measurements available at the UE for the TA validation method and/or PL estimates. Examples of this function are the difference between T1 and T2, a comparison between T1 and T2, a weighted comparison, etc. For example, if the magnitude of the difference between T1 and T2 is larger than a certain threshold X, then the UE is required to use M1 and M2 measurements (where M1 and M2 are as described in earlier section) for the TA validation:

$$|T1-T2| \geq X \quad (3)$$

Otherwise, if the above condition is not met (i.e., |T1−T2|≤X), then, in one example, the UE is allowed to use any measurements available at the UE for the TA validation. The rationale is that if T1 and T2 are largely separated in time then the radio conditions can vary a lot between these two reference times and then using M1 and M2 which are performed closely in time to T1 and T2 respectively) (e.g., by T1' and T2' respectively) can make TA validation and/or pathloss estimates more reliable. But if T1 and T2 are close in time, then radio conditions at T1 and T2 may not be significantly different with respect to each other. Therefore, the UE can use any available measurements. If the UE does not have available measurements (e.g., M1 and M2 are not available) or measurements are not reliable then the UE can also avoid carrying out TA validation method. Therefore, in the latter case it is better not to use TA validation based on such measurements at all. Alternatively, the UE can be allowed to use the TA validation method based on another method (e.g., serving cell measurement change), but in this case, the UE should perform dedicated measurements at T1 and T2. This will make the TA validation more reliable compared to performing M1 and M2 close in time to T1 and T2. Other options if the UE cannot fulfill the conditions in (3) would be to postpone the transmission by a certain time unit (T3) or to drop the transmission.

Figure 6:
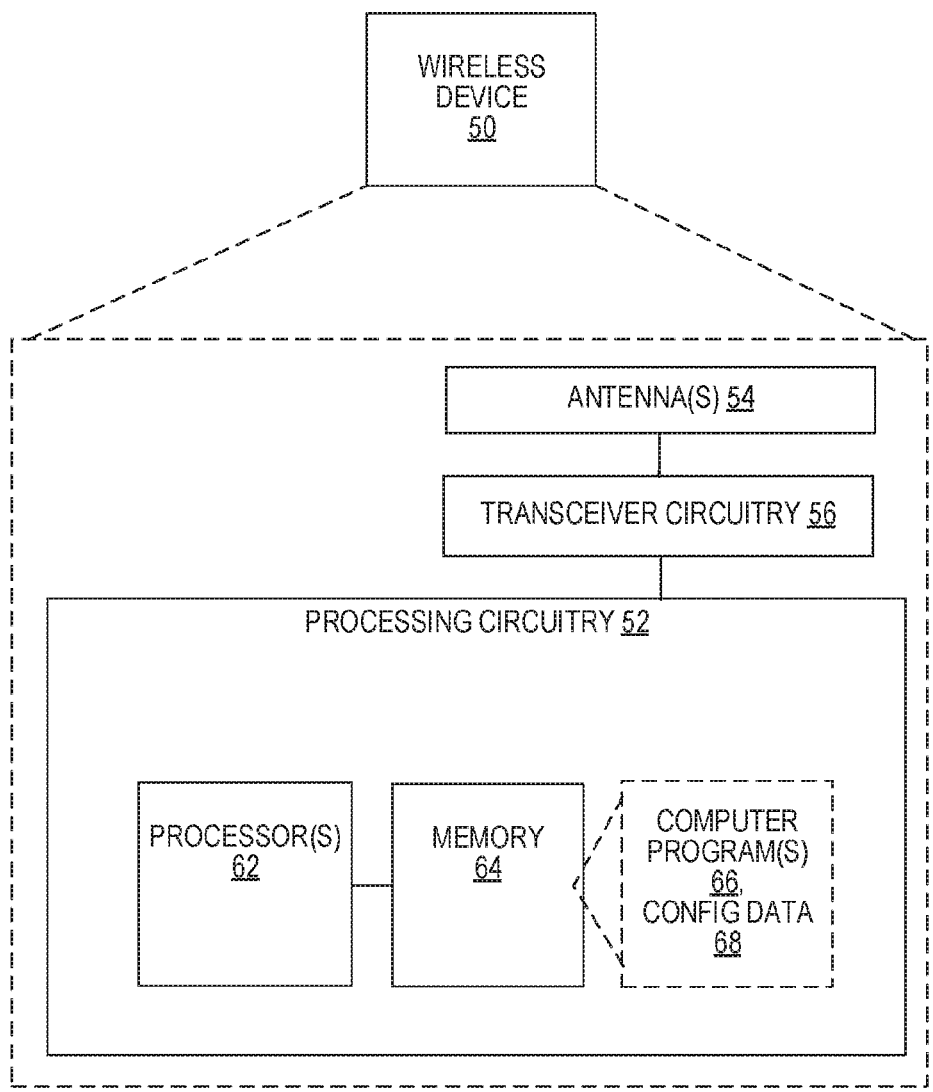
FIG. 6 illustrates is a block diagram of a wireless device, according to some embodiments.

FIG. 6 illustrates an example wireless device 50 (e.g., UE) that is configured to perform the techniques described herein for the UE. The wireless device 50 may also be considered to represent any wireless devices that may operate in a network and that are capable of communicating with a network node or another wireless device over radio signals. The wireless device 50 may also be referred to, in various contexts, as a radio communication device, a target device, a device-to-device (D2D) UE, a machine-type UE or UE capable of machine to machine (M2M) communication, a sensor-equipped UE, a PDA (personal digital assistant), a wireless tablet, a mobile terminal, a smart phone, laptop-embedded equipment (LEE), laptop-mounted equipment (LME), a wireless USB dongle, a Customer Premises Equipment (CPE), etc.

The wireless device 50 communicates with one or more radio nodes or base stations, such as one or more network nodes 30, via antennas 54 and a transceiver circuit 56. The transceiver circuit 56 may include transmitter circuits, receiver circuits, and associated control circuits that are collectively configured to transmit and receive signals according to a radio access technology, for the purposes of providing cellular communication services.

The wireless device 50 also includes one or more processing circuits 52 that are operatively associated with and control the radio transceiver circuit 56. The processing circuit 52 comprises one or more digital processing circuits 62, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, processing circuitry 52 may comprise fixed circuitry, or programmable circuitry that is specially adapted via the execution of program instructions implementing the functionality taught herein, or may comprise some mix of fixed and programmed circuitry. The processing circuitry 52 may be multi-core.

The processing circuitry 52 also includes a memory 64. Memory 64, in some embodiments, stores one or more computer programs 66 and, optionally, configuration data 68. Memory 64 provides non-transitory storage for the computer program 66 and it may comprise one or more types of computer-readable media, such as disk storage, solid-state memory storage, or any mix thereof. By way of non-limiting example, memory 64 comprises any one or more of SRAM, DRAM, EEPROM, and FLASH memory, which may be in processing circuitry 52 and/or separate from processing circuitry 52. In general, memory 64 comprises one or more types of computer-readable storage media providing non-transitory storage of computer program 66 and any configuration data 68 used by wireless device 50.

Accordingly, in some embodiments, processing circuitry 52 of wireless device 50 is configured to perform an uplink transmission. The uplink transmission may be an idle-mode uplink transmission using PUR, for example. Processing circuitry 52 is configured to determine whether a serving-cell signal measurement M2 was completed within a predetermined range of time before a reference time T2, the reference time T2 corresponding to an uplink transmission opportunity. Processing circuitry 52 is also configured to, responsive to determining that the serving-cell signal measurement M2 was not completed within the predetermined range of time, either defer transmission to a subsequent uplink transmission opportunity, or drop the uplink transmission, or collect an additional serving-cell measurement M2' that falls within the predetermined range of time, for use in validating a TA for transmitting at the transmission opportunity and/or for estimating a PL for power control of a transmission at the transmission opportunity.

Processing circuitry 52 is also configured to perform method 700, according to some embodiments. Method 700, shown in FIG. 7, includes determining whether a serving-cell signal measurement M2 was completed within a predetermined range of time before a reference time T2, the reference time T2 corresponding to a uplink transmission opportunity, e.g., a transmission opportunity using PUR (block 702). Method 700 also includes, responsive to determining that the serving-cell signal measurement M2 was not completed within the predetermined range of time, either deferring transmission to a subsequent uplink transmission opportunity, or dropping the uplink transmission, or collecting an additional serving-cell measurement M2' that falls within the predetermined range of time (block 704). In the latter case, this additional serving-cell measurement M2' may be used in validating a TA for transmitting at the transmission opportunity and/or for estimating a PL for power control of a transmission at the transmission opportunity.

Method 700 may include verifying whether a serving-cell measurement M1 was taken within a predetermined range of time around a reference time T1, the reference time T1 corresponding to a time at which the TA was established. In some embodiments or instances, the method may further comprise, in response to determining that the serving-cell measurement M1 was completed within the predetermined range of time around the reference time T1, validating the TA for transmitting at the uplink transmission opportunity and transmitting at the uplink transmission opportunity, in response to the validating of the TA. Here, validating the TA may comprise validating the TA in response to determining that the difference in magnitude between the measurement M1 and the second measurement M2 is less than a given difference threshold.

In some embodiments or instances, method 700 may further include, in response to determining that the serving-cell measurement M1 was not taken within the predetermined range of time around the reference time T1, collecting an additional serving-cell measurement M1' that falls within the predetermined range of time around the reference time T1, for use in validating the TA for subsequent transmission opportunities and/or for estimating PL changes at subsequent transmission opportunities, e.g., using the PUR. Validating the TA may include validating the TA in response to determining that the difference in magnitude between the additional serving-cell measurement M1' and the second measurement M2 is less than a given difference threshold, in which case the uplink transmission opportunity may be used for an uplink transmission in response to the validating of the TA. Validating the TA may include validating the TA in response to determining that the difference in magnitude between the first measurement M1 and the additional serving-cell measurement M2' is less than a given difference threshold, and the PUR may be used for an uplink transmission in response to the validating of the TA. In other instances where the additional serving-cell measurement M2' is collected, it may be case that the additional serving-cell measurement M2' is not less than the given difference threshold, in which case the uplink transmission may be deferred, or dropped.

In some embodiments, the estimating of the PL changes is based on the additional serving-cell measurement M2', and the uplink transmission opportunity may be used for an uplink transmission or the uplink transmission may be deferred, in response to the estimating.

According to other embodiments, processing circuitry 52 is configured to perform an uplink transmission, e.g., an idle-mode uplink transmission using PUR, by obtaining configuration information (e.g., PUR configuration information) comprising a TA at a first reference time T1 and compare a second reference time T2 to the first reference time T1, where the second reference time T2 is a time at which a TA validation, PL estimation for power control and/or path loss change estimation is to be performed. In some embodiments, the second reference time T2 may be identified from the configuration information. The processing circuitry 52 is further configured to, in response to determining that the time difference between the first and second reference times T1, T2 does not meet the given difference threshold, do one of the following: perform the TA validation, PL estimation for power control, and/or PL change estimation using any measurements available at the wireless device or performing a new measurement, and performing the uplink transmission based on the TA validation, PL estimation for power control, and/or PL change estimation; postpone the uplink transmission, e.g., until a third reference time T3; and drop the uplink transmission.

Thus, processing circuitry 52 is configured to perform method 800, according to some embodiments. Method 800, shown in FIG. 8, includes obtaining configuration information, e.g., PUR configuration information, comprising a TA at a first reference time T1 (block 802), and comparing a second reference time T2 to the first reference time T1, where the second reference time T2 is a time at which a TA validation, PL estimation for power control and/or path loss change estimation is to be performed (block 806). In some embodiments, the method may comprise identifying the second reference time T2 from the configuration information (block 804). Method 800 further includes, in response to determining that the time difference between the first and second reference times T1, T2 does not meet the given difference threshold, one of: performing the TA validation, PL estimation for power control, and/or PL change estimation using any measurements available at the wireless device or performing a new measurement, and performing the uplink transmission based on the TA validation, PL estimation for power control, and/or PL change estimation; postponing the uplink transmission; and dropping the uplink transmission (block 808).

Figure 9:
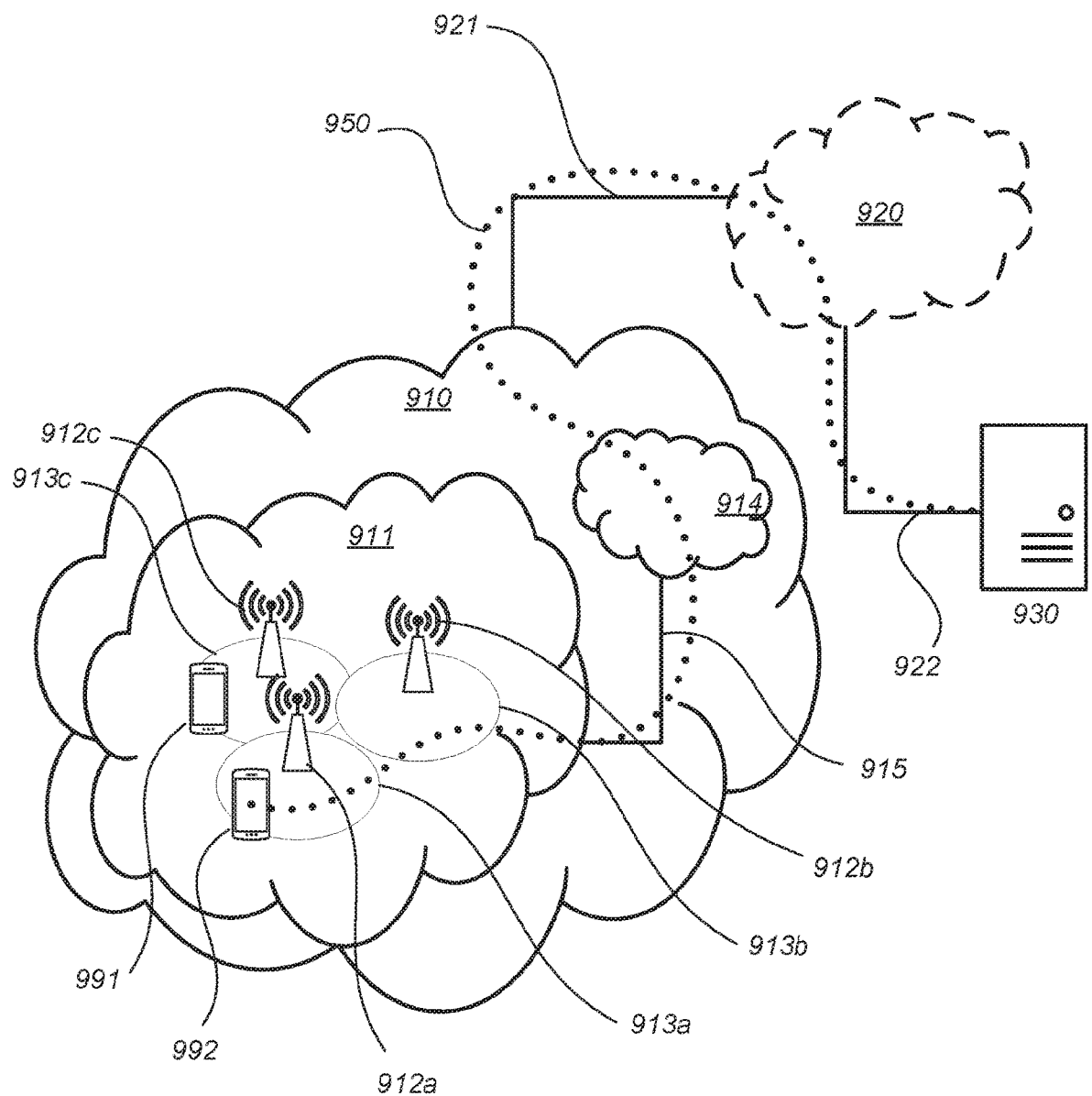
FIG. 9 schematically illustrates a telecommunication network connected via an intermediate network to a host computer, according to some embodiments.

FIG. 9, according to some embodiments, illustrates a communication system that includes a telecommunication network 910, such as a 3GPP-type cellular network, which comprises an access network 911, such as a radio access network, and a core network 914. The access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to the core network 914 over a wired or wireless connection 915. A first UE 991 located in coverage area 913c is configured to wirelessly connect to, or be paged by, the corresponding base station 912c. A second UE 992 in coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

The telecommunication network 910 is itself connected to a host computer 930, which may be embodied in the hardware and/or software of a standalone server, a cloud-implemented server, a distributed server or as processing resources in a server farm. The host computer 930 may be under the ownership or control of a service provider, or may be operated by the service provider or on behalf of the service provider. The connections 921, 922 between the telecommunication network 910 and the host computer 930 may extend directly from the core network 914 to the host computer 930 or may go via an optional intermediate network 920. The intermediate network 920 may be one of, or a combination of more than one of, a public, private or hosted network; the intermediate network 920, if any, may be a backbone network or the Internet; in particular, the intermediate network 920 may comprise two or more sub-networks (not shown).

The communication system of FIG. 9 as a whole enables connectivity between one of the connected UEs 991, 992 and the host computer 930. The connectivity may be described as an over-the-top (OTT) connection 950. The host computer 930 and the connected UEs 991, 992 are configured to communicate data and/or signaling via the OTT connection 950, using the access network 911, the core network 914, any intermediate network 920 and possible further infrastructure (not shown) as intermediaries. The OTT connection 950 may be transparent in the sense that the participating communication devices through which the OTT connection 950 passes are unaware of routing of uplink and downlink communications. For example, a base station 912 may not or need not be informed about the past routing of an incoming downlink communication with data originating from a host computer 930 to be forwarded (e.g., handed over) to a connected UE 991. Similarly, the base station 912 need not be aware of the future routing of an outgoing uplink communication originating from the UE 991 towards the host computer 930.

Example implementations, in accordance with an embodiment, of the UE, base station and host computer discussed in the preceding paragraphs will now be described with reference to FIG. 10. In a communication system 1000, a host computer 1010 comprises hardware 815 including a communication interface 1016 configured to set up and maintain a wired or wireless connection with an interface of a different communication device of the communication system 1000. The host computer 1010 further comprises processing circuitry 1018, which may have storage and/or processing capabilities. In particular, the processing circuitry 1018 may comprise one or more programmable processors, application-specific integrated circuits, field programmable gate arrays or combinations of these (not shown) adapted to execute instructions. The host computer 1010 further comprises software 1011, which is stored in or accessible by the host computer 1010 and executable by the processing circuitry 1018. The software 1011 includes a host application 1012. The host application 1012 may be operable to provide a service to a remote user, such as a UE 1030 connecting via an OTT connection 1050 terminating at the UE 1030 and the host computer 1010. In providing the service to the remote user, the host application 1012 may provide user data which is transmitted using the OTT connection 1050.

The communication system 1000 further includes a base station 1020 provided in a telecommunication system and comprising hardware 1025 enabling it to communicate with the host computer 1010 and with the UE 1030. The hardware 1025 may include a communication interface 1026 for setting up and maintaining a wired or wireless connection with an interface of a different communication device of the communication system 1000, as well as a radio interface 1027 for setting up and maintaining at least a wireless connection 1070 with a UE 1030 located in a coverage area (not shown in FIG. 10) served by the base station 1020. The communication interface 1026 may be configured to facilitate a connection 1060 to the host computer 1010. The connection 1060 may be direct or it may pass through a core network (not shown in FIG. 10) of the telecommunication system and/or through one or more intermediate networks outside the telecommunication system. In the embodiment shown, the hardware 1025 of the base station 1020 further includes processing circuitry 1028, which may comprise one or more programmable processors, application-specific integrated circuits, field programmable gate arrays or combinations of these (not shown) adapted to execute instructions. The base station 1020 further has software 1021 stored internally or accessible via an external connection.

The communication system 1000 further includes the UE 1030 already referred to. Its hardware 1035 may include a radio interface 1037 configured to set up and maintain a wireless connection 1070 with a base station serving a coverage area in which the UE 1030 is currently located. The hardware 1035 of the UE 1030 further includes processing circuitry 1038, which may comprise one or more programmable processors, application-specific integrated circuits, field programmable gate arrays or combinations of these (not shown) adapted to execute instructions. The UE 1030 further comprises software 1031, which is stored in or accessible by the UE 1030 and executable by the processing circuitry 1038. The software 1031 includes a client application 1032. The client application 1032 may be operable to provide a service to a human or non-human user via the UE 1030, with the support of the host computer 1010. In the host computer 1010, an executing host application 1012 may communicate with the executing client application 1032 via the OTT connection 1050 terminating at the UE 1030 and the host computer 1010. In providing the service to the user, the client application 1032 may receive request data from the host application 1012 and provide user data in response to the request data. The OTT connection 1050 may transfer both the request data and the user data. The client application 1032 may interact with the user to generate the user data that it provides.

Figure 10:
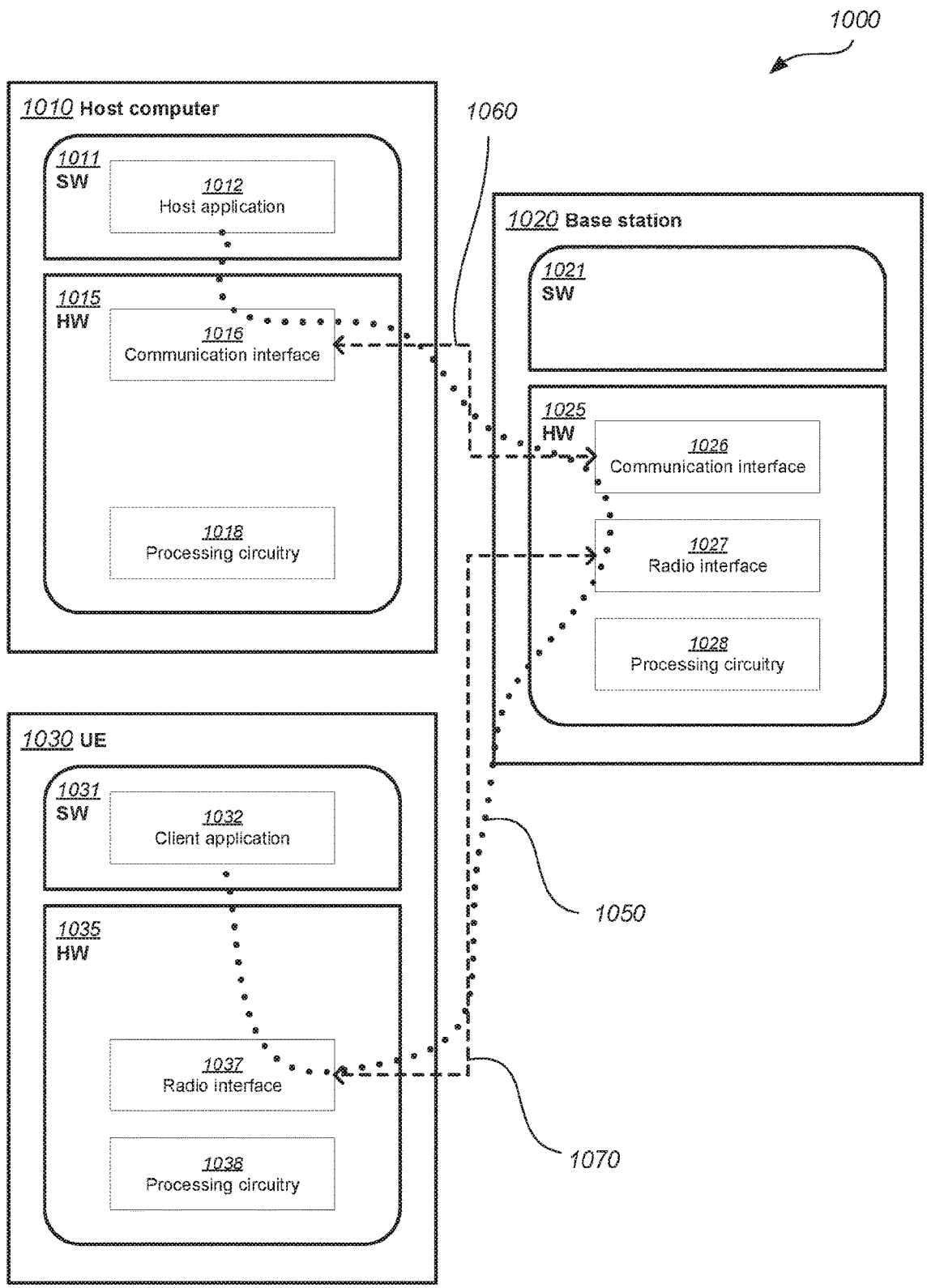
FIG. 10 is a generalized block diagram of a host computer communicating via a base station with a user equipment over a partially wireless connection, according to some embodiments.

It is noted that the host computer 1010, base station 1020 and UE 1030 illustrated in FIG. 10 may be identical to the host computer 1030, one of the base stations 1012a, 1012b, 1012c and one of the UEs 1091, 1092 of FIG. 10, respectively. This is to say, the inner workings of these entities may be as shown in FIG. 10 and independently, the surrounding network topology may be that of FIG. 9.

In FIG. 10, the OTT connection 1050 has been drawn abstractly to illustrate the communication between the host computer 1010 and the use equipment 1030 via the base station 1020, without explicit reference to any intermediary devices and the precise routing of messages via these devices. Network infrastructure may determine the routing, which it may be configured to hide from the UE 1030 or from the service provider operating the host computer 1010, or both. While the OTT connection 1050 is active, the network infrastructure may further take decisions by which it dynamically changes the routing (e.g., on the basis of load balancing consideration or reconfiguration of the network).

The wireless connection 1070 between the UE 1030 and the base station 1020 is in accordance with the teachings of the embodiments described throughout this disclosure, such as provided by nodes such as a wireless device and relay node 30, along with the corresponding methods 700 and 800. The embodiments described herein provide for improved TA validation and PL estimation. The teachings of these embodiments may improve the reliability, connections, data rate, capacity, latency and/or power consumption for the network and UE 1030 using the OTT connection 1050.

A measurement procedure may be provided for the purpose of monitoring data rate, latency and other factors on which the one or more embodiments improve. There may further be an optional network functionality for reconfiguring the OTT connection 1050 between the host computer 1010 and UE 1030, in response to variations in the measurement results. The measurement procedure and/or the network functionality for reconfiguring the OTT connection 1050 may be implemented in the software 1011 of the host computer 1010 or in the software 1031 of the UE 1030, or both. In embodiments, sensors (not shown) may be deployed in or in association with communication devices through which the OTT connection 1050 passes; the sensors may participate in the measurement procedure by supplying values of the monitored quantities exemplified above, or supplying values of other physical quantities from which software 1011, 1031 may compute or estimate the monitored quantities. The reconfiguring of the OTT connection 1050 may include message format, retransmission settings, preferred routing etc.; the reconfiguring need not affect the base station 1020, and it may be unknown or imperceptible to the base station 1020. Such procedures and functionalities may be known and practiced in the art. In certain embodiments, measurements may involve proprietary UE signaling facilitating the host computer's 1010 measurements of throughput, propagation times, latency and the like. The measurements may be implemented in that the software 1011, 1031 causes messages to be transmitted, in particular empty or 'dummy' messages, using the OTT connection 1050 while it monitors propagation times, errors etc.

FIG. 11 is a flowchart illustrating a method implemented in a communication system. The communication system includes a host computer, a base station and a UE which may be those described with reference to FIGS. 9 and 10. For simplicity of the present disclosure, only drawing references to FIG. 11 will be included in this section. In a first step 1110 of the method, the host computer provides user data. In an optional substep 1111 of the first step 1110, the host computer provides the user data by executing a host application. In a second step 1120, the host computer initiates a transmission carrying the user data to the UE. In an optional third step 1130, the base station transmits to the UE the user data which was carried in the transmission that the host computer initiated, in accordance with the teachings of the embodiments described throughout this disclosure. In an optional fourth step 1140, the UE executes a client application associated with the host application executed by the host computer.

FIG. 12 is a flowchart illustrating a method implemented in a communication system. The communication system includes a host computer, a base station and a UE which may be those described with reference to FIGS. 9 and 10. For simplicity of the present disclosure, only drawing references to FIG. 12 will be included in this section. In a first step 1210 of the method, the host computer provides user data. In an optional substep (not shown) the host computer provides the user data by executing a host application. In a second step 1220, the host computer initiates a transmission carrying the user data to the UE. The transmission may pass via the base station, in accordance with the teachings of the embodiments described throughout this disclosure. In an optional third step 1230, the UE receives the user data carried in the transmission.

Figures 13, 14:
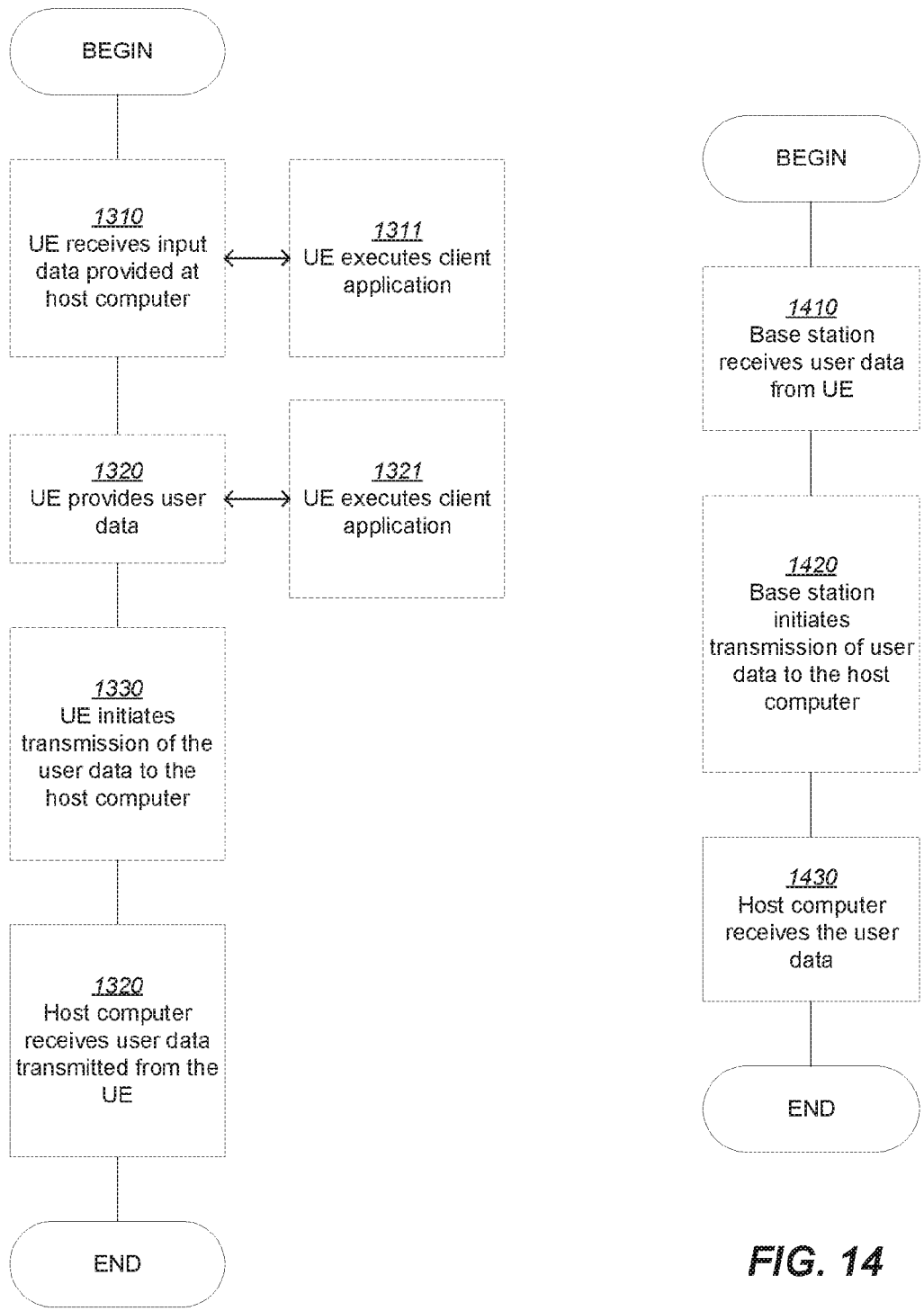

FIG. 13 is a flowchart illustrating a method implemented in a communication system. The communication system includes a host computer, a base station and a UE which may be those described with reference to FIGS. 9 and 10. For simplicity of the present disclosure, only drawing references to FIG. 13 will be included in this section. In an optional first step 1310 of the method, the UE receives input data provided by the host computer. Additionally, or alternatively, in an optional second step 1320, the UE provides user data. In an optional substep 1321 of the second step 1320, the UE provides the user data by executing a client application. In a further optional substep 1311 of the first step 1310, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1330, transmission of the user data to the host computer. In a fourth step 1340 of the method, the host computer receives the user data transmitted from the UE, in accordance with the teachings of the embodiments described throughout this disclosure.

FIG. 14 is a flowchart illustrating a method implemented in a communication system. The communication system includes a host computer, a base station and a UE which may be those described with reference to FIGS. 9 and 10. For simplicity of the present disclosure, only drawing references to FIG. 14 will be included in this section. In an optional first step 1410 of the method, in accordance with the teachings of the embodiments described throughout this disclosure, the base station receives user data from the UE. In an optional second step 1420, the base station initiates transmission of the received user data to the host computer. In a third step 1430, the host computer receives the user data carried in the transmission initiated by the base station.

Figure 8:
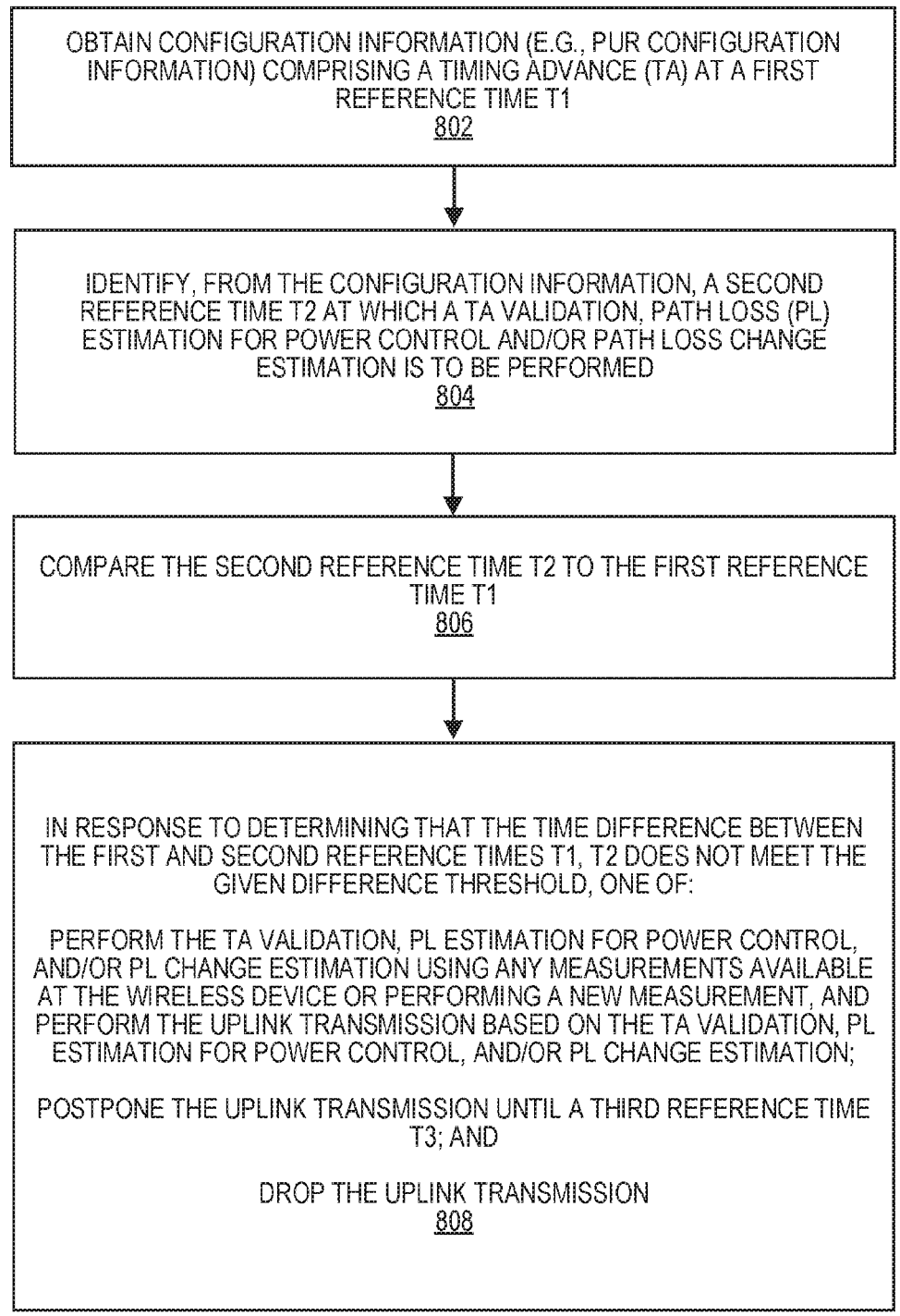
FIG. 8 illustrates a flowchart illustrating a method in the wireless device, according to some embodiments.

As discussed in detail above, the techniques described herein, e.g., as illustrated in the process flow diagram of FIGS. 7 and 8, may be implemented, in whole or in part, using computer program instructions executed by one or more processors. It will be appreciated that a functional implementation of these techniques may be represented in terms of functional modules, where each functional module corresponds to a functional unit of software executing in an appropriate processor or to a functional digital hardware circuit, or some combination of both.

Figure 15:
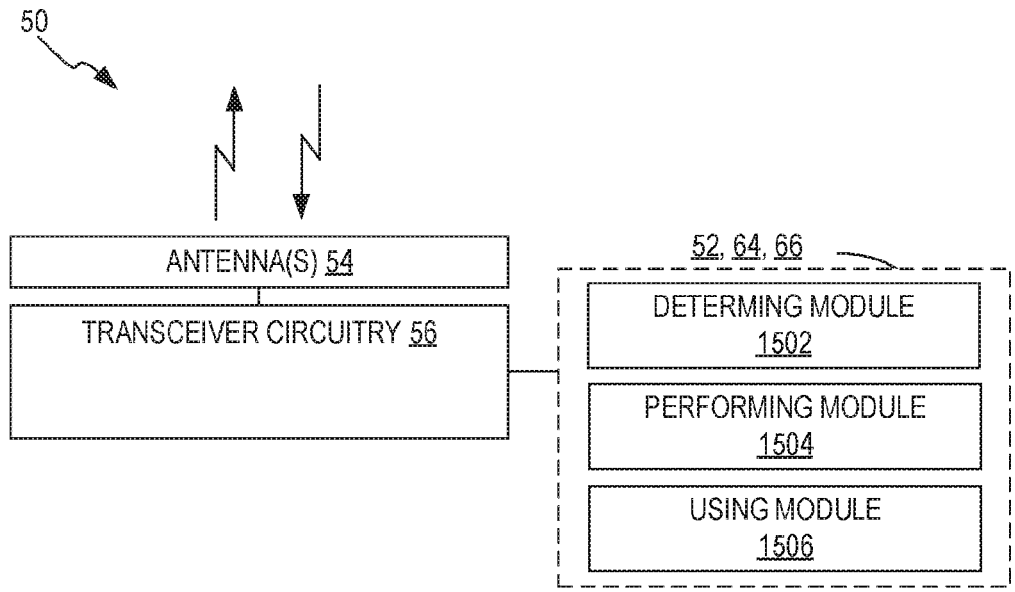
FIG. 15 is a block diagram illustrating a functional implementation of a wireless device, according to some embodiments.

FIG. 15 illustrates an example functional module or circuit architecture for wireless device 50, configured for performing an uplink transmission, such as an idle-mode uplink transmission using PUR. The implementation includes a determining module 1502 for determining whether a serving-cell signal measurement M2 was taken within a predetermined range of time before a reference time T2, the reference time T2 corresponding to a transmission opportunity. The implementation also includes a performing module for, responsive to determining that the serving-cell signal measurement M2 was not taken within the predetermined range of time, either deferring transmission to a subsequent transmission opportunity or collecting an additional serving-cell measurement M2' that falls within the predetermined range of time, for use in validating a TA for transmitting at the transmission opportunity and/or for estimating a PL for power control of a transmission at the transmission opportunity. The implementation may also include using module 1506 for performing the uplink transmission.

Figure 16:
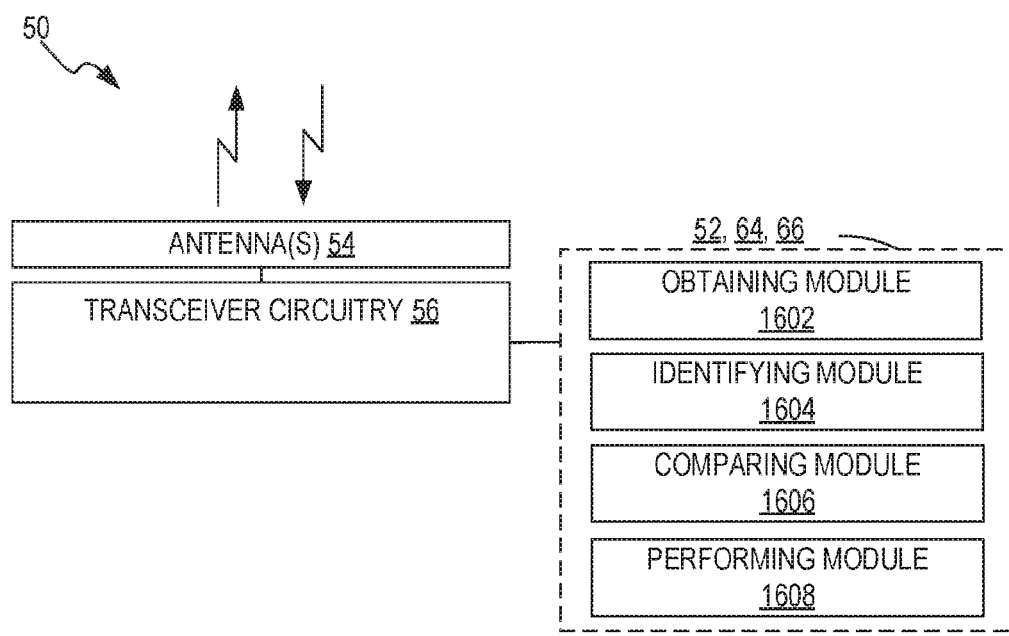
FIG. 16 is a block diagram illustrating a functional implementation of a wireless device, according to some embodiments.

FIG. 16 illustrates another example functional module or circuit architecture for wireless device 50. The functional implementation includes an obtaining module 1602 for obtaining configuration information, such as PUR configuration information, comprising a TA at a first reference time T1 and an identifying module 1604 for identifying, from the configuration information, a second reference time T2 at which a TA validation, PL estimation for power control, and/or path loss change estimation is to be performed. The implementation also includes a comparing module 1606 for comparing the second reference time T2 to the first reference time T1 and a performing module 1608 for, in response to determining that the time difference between the first and second reference times T1, T2 does not meet the given difference threshold, one of: performing the TA validation, PL estimation for power control, and/or PL change estimation using any measurements available at the wireless device or performing a new measurement, and performing the uplink transmission based on the TA validation (e.g., using PUR resources), PL estimation for power control and/or PL change estimation; postponing the uplink transmission until a third reference time T3; and dropping the uplink transmission.

Example Embodiments

Example embodiments can include, but are not limited to, the following enumerated examples:

1. A method, performed by a wireless device, for performing an idle-mode uplink transmission using preconfigured uplink resources (PUR), the method comprising:
   determining whether a serving-cell signal measurement M2 was taken within a predetermined range of time before a reference time T2, the reference time T2 corresponding to a transmission opportunity using the PUR; and, responsive to determining that the serving-cell signal measurement M2 was not taken within the predetermined range of time, either deferring transmission to a subsequent transmission opportunity using the PUR or collecting an additional serving-cell measurement M2' that falls within the predetermined range of time, for use in validating a timing advance (TA) for transmitting at the transmission opportunity and/or for estimating a path loss (PL) for power control of a transmission at the transmission opportunity.

2. The method of claim 1, wherein the method further comprises, prior to said determining:
verifying whether a serving-cell measurement M1 was taken within a predetermined range of time around a reference time T1, the reference time T1 corresponding to a time at which the TA was established.

3. The method of claim 2, wherein the method further comprises, in response to determining that the serving-cell measurement M1 was not taken within the predetermined range of time around the reference time T1, collecting an additional serving-cell measurement M1' that falls within the predetermined range of time around the reference time T1, for use in validating the TA for subsequent transmission opportunities using the PUR and/or for estimating PL changes at subsequent transmission opportunities using the PUR.

4. The method of example embodiment 3, wherein:
validating the TA comprises validating the TA in response to determining that the difference in magnitude between the additional serving-cell measurement M1' and the second measurement M2 is less than a given difference threshold; and
wherein the PUR is used for an uplink transmission in response to the validating of the TA.

5. The method of example embodiment 1, wherein:
validating the TA comprises validating the TA in response to determining that the difference in magnitude between the first measurement M1 and the additional serving-cell measurement M2' is less than a given difference threshold; and
wherein the PUR is used for an uplink transmission in response to the validating of the TA.

6. The method of any of example embodiments 1-5, wherein:
the estimating of the PL changes is based on the additional serving-cell measurement M2'; and
wherein the PUR is used for an uplink transmission or deferred, in response to the estimating.

7. A method, performed by a wireless device for performing an idle-mode uplink transmission using preconfigured uplink resources (PUR), the method comprising:
obtaining PUR configuration information comprising a Timing Advance (TA) at a first reference time T1;
identifying, from the PUR configuration information, a second reference time T2 at which a TA validation, path loss (PL) estimation for power control and/or path loss change estimation is to be performed;
comparing the second reference time T2 to the first reference time T1; and
in response to determining that the time difference between the first and second reference times T1, T2 does not meet the given difference threshold, one of:
performing the TA validation, PL estimation for power control and/or PL change estimation using any measurements available at the wireless device or performing a new measurement, and using the PUR resources for the uplink transmission based on the TA validation, PL estimation for power control and/or PL change estimation;
postponing the use of the PUR resources for the uplink transmission until a third reference time T3; and
dropping the use of the PUR resources for the uplink transmission.

8. A wireless device adapted to perform a method according to any of example embodiments 1-7.

9. A wireless device comprising transceiver circuitry and processing circuitry operatively associated with the transceiver circuitry and configured to perform a method according to any of example embodiments 1-7.

10. A computer program comprising instructions that, when executed on at least one processing circuit, cause the at least one processing circuit to carry out a method according to any one of example embodiments 1-7.

11. A carrier containing the computer program of example embodiment 10, wherein the carrier is one of an electronic signal, optical signal, radio signal, or computer readable storage medium.

A1. A communication system including a host computer comprising:
processing circuitry configured to provide user data; and
a communication interface configured to forward the user data to a cellular network for transmission to a user equipment (UE), wherein the cellular network comprises a base station, the UE having a radio interface and processing circuitry, wherein the UE processing circuitry is configured to perform any of the operations comprising embodiments 1-7.

A2. The communication system of the previous embodiment further including the base station.

A3. The communication system of the previous two embodiments, further including the UE, wherein the UE is configured to communicate with the base station.

A4. The communication system of the previous three embodiments, wherein:
the processing circuitry of the host computer is configured to execute a host application, thereby providing the user data; and
the UE comprises processing circuitry configured to execute a client application associated with the host application.

A5. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of embodiments 1-7.

A6. The method of the previous embodiment, further comprising, at the base station, transmitting the user data.

A7. The method of the previous 2 embodiments, wherein the user data is provided at the host computer by executing a host application, the method further comprising, at the UE, executing a client application associated with the host application.

A8. A communication system including a host computer comprising a communication interface configured to receive user data originating from a transmission from a User equipment (UE) to a base station, the UE comprising a radio interface and processing circuitry configured to communicate with the base station and cooperatively perform operations of any of embodiments 1-7.

A9. The communication system of the previous embodiment further including the base station.

A10. The communication system of the previous two embodiments, further including the UE, wherein the UE is configured to communicate with the base station.

A11. The communication system of the previous three embodiments, wherein:
the processing circuitry of the host computer is configured to execute a host application; and
the UE is further configured to execute a client application associated with the host application, thereby providing the user data to be received by the host computer.

A12. A method implemented in a communication system including a host computer, a base station and a user equipment (UE), the method comprising:
at the host computer, receiving, from the base station, user data originating from a transmission which the base station has received from the UE, wherein the UE performs any of the steps of any of embodiments 1-7.

A13. The method of the previous embodiment, further comprising at the base station, receiving the user data from the UE.

A14. The method of the previous two embodiments, further comprising at the base station, initiating a transmission of the received user data to the host computer.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the examples of embodiments and their equivalents, and shall not be restricted or limited by the foregoing detailed description.

What is claimed is:

1. A method, performed by a wireless device, for performing an uplink transmission, the method comprising:
determining whether a serving-cell signal measurement M2 was completed within a predetermined range of time before and no later than a reference time T2, the reference time T2 corresponding to an uplink transmission opportunity; and
responsive to determining that the serving-cell signal measurement M2 was not completed within the predetermined range of time, either deferring transmission to a subsequent uplink transmission opportunity, or dropping the uplink transmission, or collecting an additional serving-cell measurement M2' that falls within the predetermined range of time.

2. The method of claim 1, wherein the uplink transmission opportunity is a time-frequency resource in idle-mode uplink for performing an uplink transmission using preconfigured uplink resources, PUR.

3. The method of claim 1, wherein the method further comprises, prior to the determining:
verifying whether a serving-cell measurement M1 was completed within a predetermined range of time around a reference time T1, the reference time T1 corresponding to a time at which a timing advance, TA, is obtained for transmitting at the uplink transmission opportunity.

4. The method of claim 3, further comprising:
in response to determining that the serving-cell measurement M1 was completed within the predetermined range of time around the reference time T1,
validating the TA for transmitting at the uplink transmission opportunity, wherein validating the TA comprises validating the TA in response to determining that a difference in magnitude between the measurement M1 and the measurement M2 is less than a given difference threshold; and
transmitting at the uplink transmission opportunity, in response to the validating of the TA.

5. The method of claim 3, further comprising:
in response to determining that the serving-cell measurement M1 was completed within the predetermined range of time around the reference time T1, determining that a difference in magnitude between the measurement M1 and the measurement M2 is not less than a given difference threshold; and
dropping the uplink transmission, in response to the determining.

6. The method of claim 3, wherein the method further comprises:
in response to determining that the serving-cell measurement M1 was not completed within the predetermined range of time around the reference time T1, collecting an additional serving-cell measurement M1' that falls within the predetermined range of time around the reference time T1.

7. The method of claim 6, further comprising:
validating the TA for transmitting at the uplink transmission opportunity, wherein validating the TA comprises validating the TA in response to determining that the difference in magnitude between the additional serving-cell measurement M1' and the measurement M2 is less than a given difference threshold; and
transmitting at the uplink transmission opportunity, in response to the validating of the TA.

8. The method of claim 6, further comprising:
determining that the difference in magnitude between the additional serving-cell measurement M1' and the measurement M2 is not less than a given difference threshold; and
dropping the uplink transmission, in response to the determining.

9. The method of claim 1, wherein the method comprises collecting the additional serving-cell measurement M2' and wherein the method further comprises:
validating the TA for transmitting at the uplink transmission opportunity, wherein validating the TA comprises validating the TA in response to determining that the difference in magnitude between the measurement M1 and the additional serving-cell measurement MT is less than a given difference threshold; and
transmitting at the uplink transmission opportunity, in response to the validating of the TA.

10. The method of claim 1, further comprising:
estimating a path loss, PL, for power control of transmission at the uplink transmission opportunity, wherein the estimating of the PL is based on the additional serving-cell measurement M2'; and
transmitting at the uplink transmission opportunity, based on the estimating.

11. A wireless device comprising transceiver circuitry and processing circuitry operatively associated with the transceiver circuitry and configured to perform operations comprising:

determining whether a serving-cell signal measurement M2 was completed within a predetermined range of time before and no later than a reference time T2, the reference time T2 corresponding to an uplink transmission opportunity; and responsive to determining that the serving-cell signal measurement M2 was not completed within the predetermined range of time:
- deferring transmission to a subsequent uplink transmission opportunity, or
- dropping the uplink transmission, or
- collecting an additional serving-cell measurement M2' that falls within the predetermined range of time.

12. The wireless device of claim 11, wherein the uplink transmission opportunity is a time-frequency resource in idle-mode uplink for performing an uplink transmission using preconfigured uplink resources, PUR.

13. The wireless device of claim 11, wherein the operations further comprise:
prior to the determining, verifying whether a serving-cell measurement M1 was completed within a predetermined range of time around a reference time T1, the reference time T1 corresponding to a time at which a timing advance (TA) is obtained for transmitting at the uplink transmission opportunity.

14. The wireless device of claim 13, further comprising:
in response to determining that the serving-cell measurement M1 was completed within the predetermined range of time around the reference time T1,
validating the TA for transmitting at the uplink transmission opportunity, wherein validating the TA comprises validating the TA in response to determining that a difference in magnitude between the measurement M1 and the measurement M2 is less than a given difference threshold; and
transmitting at the uplink transmission opportunity, in response to the validating of the TA.

15. The wireless device of claim 13, further comprising:
in response to determining that the serving-cell measurement M1 was completed within the predetermined range of time around the reference time T1, determining that a difference in magnitude between the measurement M1 and the measurement M2 is not less than a given difference threshold; and
dropping the uplink transmission, in response to the determining.

* * * * *